(12) United States Patent
Nami et al.

(10) Patent No.: US 10,256,745 B2
(45) Date of Patent: Apr. 9, 2019

(54) MULTILEVEL CONVERTER WITH REDUCED AC FAULT HANDLING RATING

(71) Applicant: ABB SCHWEIZ AG, Baden (CH)

(72) Inventors: Alireza Nami, Västerås (SE); Jiaqi Liang, Cary, NC (US); Frans Dijkhuizen, Skuluna (SE); Liwei Wang, Kelowna (CA)

(73) Assignee: ABB SCHWEIZ AG, Baden (CH)

( * ) Notice: Subject to any disclaimer, the term of this patent is extended or adjusted under 35 U.S.C. 154(b) by 84 days.

(21) Appl. No.: 15/327,755

(22) PCT Filed: Nov. 25, 2014

(86) PCT No.: PCT/EP2014/075513
§ 371 (c)(1),
(2) Date: Jan. 20, 2017

(87) PCT Pub. No.: WO2016/012060
PCT Pub. Date: Jan. 28, 2016

(65) Prior Publication Data
US 2018/0212533 A1    Jul. 26, 2018

(30) Foreign Application Priority Data

Jul. 22, 2014  (WO) .................. PCT/EP2014/065673

(51) Int. Cl.
*H02M 1/32*  (2007.01)
*H02M 7/483*  (2007.01)
(Continued)

(52) U.S. Cl.
CPC ........... *H02M 7/483* (2013.01); *H02J 3/1842* (2013.01); *H02M 1/12* (2013.01); *H02M 1/32* (2013.01); *H02M 2007/4835* (2013.01)

(58) Field of Classification Search
CPC . H02M 2007/4835; H02M 7/483; H02M 1/32
See application file for complete search history.

(56) References Cited

U.S. PATENT DOCUMENTS

| | | | |
|---|---|---|---|
| 2013/0308235 A1* | 11/2013 | Davies ................ | H02H 7/1257 361/62 |
| 2014/0002933 A1* | 1/2014 | Gao ........................ | H02M 1/32 361/18 |

FOREIGN PATENT DOCUMENTS

| | | |
|---|---|---|
| WO | WO 2010/149200 A1 | 12/2010 |
| WO | WO 2011/012174 A1 | 2/2011 |

(Continued)

OTHER PUBLICATIONS

WO2013064310; Steimer Peter; ABB Technology AG;.*
(Continued)

*Primary Examiner* — Matthew V Nguyen
*Assistant Examiner* — Ishrat Jamali
(74) *Attorney, Agent, or Firm* — Birch, Stewart, Kolasch & Birch, LLP (57) ABSTRACT

A multilevel converter converting between AC and DC includes a phase leg having a first and a second phase arm, the first phase arm being connected between a first pole having a first potential and a first AC terminal and the second phase arm being connected between the first AC terminal and a second potential, where the phase arms include half-bridge and full-bridge cells, where each cell includes at least one energy storage element for providing the voltage contribution and cell switching units with cell switches and anti-parallel diodes for controlling the voltage contribution, where the full-bridge cells include a bypass switch controllable to bypass the corresponding energy storage element, and when a phase-to-ground fault occurs the cell switches are blocked and the bypass switches activated with a delay in relation to the blocking.

18 Claims, 8 Drawing Sheets

(51) Int. Cl.
   *H02J 3/18*   (2006.01)
   *H02M 1/12*   (2006.01)

(56)   References Cited

FOREIGN PATENT DOCUMENTS

| WO | WO 2011/042050 A1 | 4/2011 |
| WO | WO 2011/124260 A1 | 10/2011 |
| WO | WO 2013/017145 A1 | 2/2013 |
| WO | WO 2014/111595 A1 | 7/2014 |

OTHER PUBLICATIONS

Lesnicar et al., "A new modular voltage source inverter topology", EPE 2003, 10 pages.
Li et al., "Protection of Nonpermanent Faults on DC Overhead Lines in MMC-Based HVDC Systems", IEEE Transactions on Power Delivery, IEEE Service Center, NY, NY, Jan. 2013, XP011483733, vol. 28, No. 1, pp. 483-490, Fig. 2, pp. 483-485.
Marquardt et al., "New Concept for high voltage—Modular multi-level converter", IEEE 2004, PESC 2004 Conference in Aachen, Germany, 5 pages.

* cited by examiner

MULTILEVEL CONVERTER WITH REDUCED AC FAULT HANDLING RATING

FIELD OF INVENTION

The present invention generally relates to multilevel converters. More particularly the present invention relates to a multilevel converter configured to convert between alternating current and direct current.

BACKGROUND

Multilevel converters are of interest to use in a number of different power transmission environments. They may for instance be used as voltage source converters in direct current power transmission systems such as high voltage direct current (HVDC) and alternating current power transmission systems, such as flexible alternating current transmission system (FACTS). They may also be used as reactive compensation circuits such as Static VAR compensators.

In order to reduce harmonic distortion in the output of power electronic converters, where the output voltages can assume several discrete levels, so called multilevel converters have been proposed. In particular, converters where a number of cascaded converter cells, each comprising a number of switching units and an energy storage unit in the form of a DC capacitor have been proposed.

Examples of such converters can be found in Marquardt, 'New Concept for high voltage-Modular multilevel converter', IEEE 2004, A. Lesnicar, R. Marquardt, "A new modular voltage source inverter topology", EPE 2003, WO 2010/149200 and WO 2011/124260.

Converter elements or cells in such a converter may for instance be of the half-bridge, full-bridge or clamped double cell type. These may be connected in upper and lower phase arms of a phase leg.

A half-bridge connection in upper and lower arms provides unipolar cell voltage contributions and offers the simplest structure of the chain link converter. This type is described by Marquardt,'New Concept for high voltage-Modular multilevel converter', IEEE 2004 and A. Lesnicar, R. Marquardt, "A new modular voltage source inverter topology", EPE 2003.

However, there is a problem with the half-bridge topology in that the fault current blocking ability in the case of a DC fault, such as a DC pole-to-pole or a DC pole-to-ground fault, is limited.

One way to address this is through the use of full-bridge cells. This is described in WO 2011/012174. Series connection of full-bridge cells offers four quadrant power flows through the energy storage element of the cell capacitor as well as DC fault voltage blocking capability by imposing a reverse voltage. However, the use of full-bridge cells doubles the number of components compared with a half-bridge cell.

One way to reduce the number of components combined with a retained fault current limiting ability is through mixing the cells of the half- and full-bridge type. Half of the cells may then be full-bridge cells used for imposing the reverse voltage due to the rating of the cascaded converter cells. This is for instance described in WO 2011/042050. The mixing of cells reduces the number of components further while retaining a good fault current limitation ability.

However there is still room for improvement with regard to component reduction combined with fault current limitation.

SUMMARY OF THE INVENTION

The present invention is directed towards providing a reduction of the converter voltage rating required for a phase arm in order to handle AC phase faults.

This object is according to a first aspect achieved through a multilevel converter configured to convert between alternating current and direct current and comprising
a phase leg having a first and a second phase arm, the first phase arm being connected between a first pole having a first potential and a first AC terminal (ACA1) and the second phase arm being connected between the first AC terminal and a second potential, and a control unit,
the phase arms comprising cells of a first type having a unipolar voltage contribution and cells of a second type having a bipolar voltage contribution, where each cell comprises at least one energy storage element for providing the voltage contribution and cell switching units with cell switches and anti-parallel diodes for controlling the voltage contribution, where the cells of the second type in the second phase arm each comprise a bypass switch controllable to bypass the corresponding energy storage element, and
the control unit is configured to block the cell switches when a phase-to-ground fault occurs and activate the bypass switches with a delay in relation to the blocking.

This object is according to a second aspect achieved through a method of controlling fault handling in a phase leg of a multilevel converter converting between alternating current and direct current, the phase leg having a first and a second phase arm, where the first phase arm is connected between a first pole providing a first potential and a first AC terminal and the second phase arm is connected between the first AC terminal and a second potential, the phase leg comprising cells of a first type having a unipolar voltage contribution and cells of a second type having a bipolar voltage contribution, where each cell comprises at least one energy storage element for providing the voltage contribution and switching units comprising cell switches with anti-parallel diodes for controlling the voltage contribution, wherein the cells of the second type in the second phase arm each comprise a bypass switch controllable to bypass the corresponding energy storage element, the method comprising
upon the detection of a phase fault on the AC side of the multilevel converter,
blocking (22) cell switches of the cells in the phase leg, and
activating (24) the bypass switches to bypass corresponding energy storage elements, wherein the activating is made with a delay in relation to the blocking.

The invention has a number of advantages in addition to DC fault current blocking capability. It reduces the over-voltage experienced by the first phase arm in case of AC faults. Thereby the converter can be made considerably smaller while still allowing the AC phase faults be handled safely.

BRIEF DESCRIPTION OF THE DRAWINGS

The present invention will in the following be described with reference being made to the accompanying drawings, where
FIG. 1 schematically shows a cell-based voltage source converter connected between a pole and ground,
FIG. 2 schematically shows a first variation of a full-bridge cell, FIG. 3 schematically shows a first variation of a half-bridge cell, FIG. 4 schematically shows a second variation of a full-bridge cell comprising a bypass switch, FIG. 5 schematically shows a second variation of a half-bridge cell, FIG. 6 schematically shows an asymmetric monopole converter employing the first and second variations of full-and half-bridge cells, FIG. 7 schematically shows a control unit of the converter.

DETAILED DESCRIPTION OF THE INVENTION

In the following, a detailed description of preferred embodiments of the invention will be given.

Figure 1:
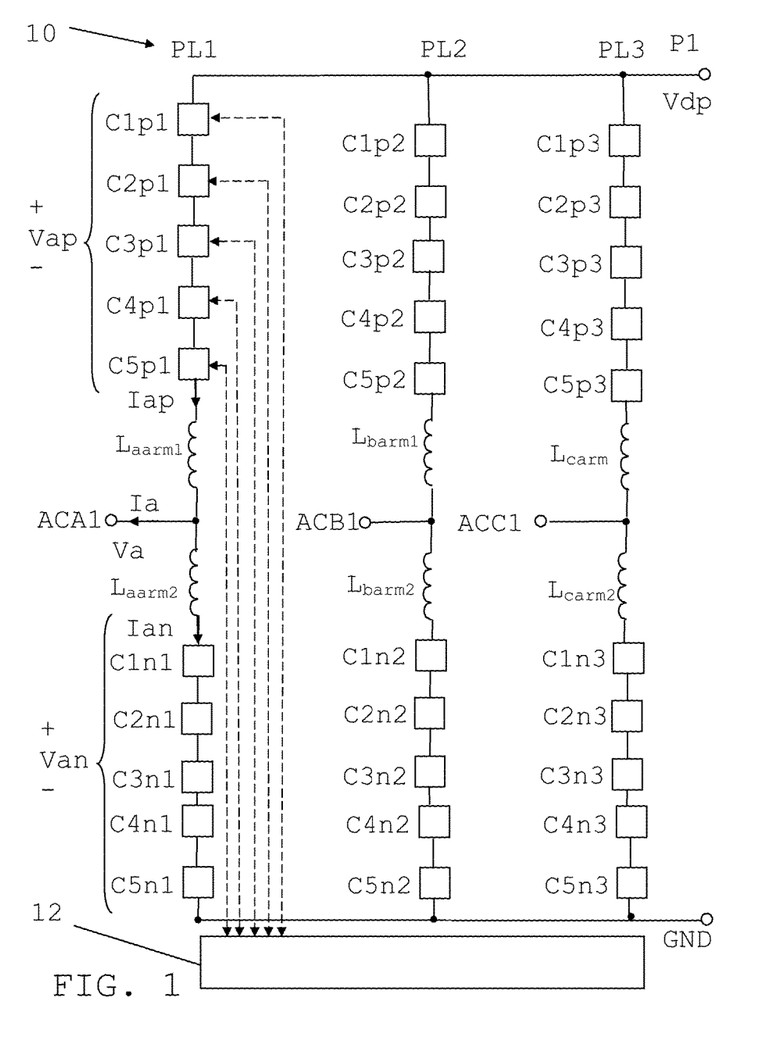

FIG. 1 shows one variation of a multilevel converter in the form of a cell based voltage source converter 10. The converter operates to convert between alternating current (AC) and direct current (DC). The converter 10 in FIG. 1 comprises a three-phase bridge made up of a number of phase legs. There are in this case three phase legs. It should however be realized that as an alternative there may be for instance only two phase legs. There is thus a first phase leg PL1, a second phase leg PL2 and a third phase leg PL3. The phase legs are more particularly connected between a first DC pole P1 and ground, where the mid points of the phase legs are connected to corresponding alternating current terminals ACA1, ACB1, ACC1. The current Ia output on the AC terminal ACA1 as well as the voltage Va of the AC terminal ACA1 is also indicated. A phase leg is in this example divided into two halves, a first upper half and a second lower half, where such a half is also termed a phase arm.

The first DC pole P1 furthermore has a first potential Vp that may be positive. The first potential is thereby a first DC potential. The first pole P1 may therefore also be termed a positive pole. The pole may furthermore be part of a DC power transmission system such as a High Voltage Direct Current (HVDC) power transmission system. The AC terminals ACA1, ACB1, ACC1 may in turn be connected to an AC system, such as a flexible alternating current transmission system (FACTS), for instance via a transformer. A phase arm between the first pole P1 and a first AC terminal ACA1, ACB1 and ACC1 may be termed a first phase arm or an upper phase arm, while a phase arm between the first AC terminal and a second potential, may be termed a second phase arm or a lower phase arm. The second potential Vdn is in this case ground.

As mentioned above, the type of voltage source converter shown in FIG. 1 is only one example of a multilevel converter where the invention may be used. It is for instance possible to provide the three phase legs in series with each other between two poles, where these then make up a first set of phase legs. It is then possible to provide a second set of series-connected phase legs in parallel with the first set. In this case the midpoints of the phase legs of the first set forms primary AC terminals and the midpoints of the phase legs of the second set forms secondary AC terminals for the three phases.

The phase arms of the voltage source converter 10 in the example in FIG. 1 comprise cells. A cell is a unit that may be switched for providing a voltage contribution to the voltage on the corresponding AC terminal. A cell then comprises one or more energy storage elements, for instance in the form of capacitors, and the cell may be switched to provide a voltage contribution corresponding to the voltage of the energy storage element or a zero voltage contribution. If more than one energy storage element is included in a cell it is possible with even further voltage contributions.

The cells are with advantage connected in series or in cascade in a phase arm.

In the example given in FIG. 1 there are five series-connected or cascaded cells in each phase arm. Thus the upper phase arm of the first phase leg PL1 includes five cells C1p1, C2p1, C3p1, C4p1 and C5p1, while the lower phase arm of the first phase leg PL1 includes five cells C1n1, C2n1, C3n1, C4n1 and C5n1. Across the cells of the upper phase arm there is a first phase arm voltage Vap and through the upper phase arm there runs a first phase arm current Iap. As the upper phase arm is connected to the first pole P1 it may also be considered to be a positive phase arm. Across the cells of the lower phase arm there is a second phase arm voltage Van and through the lower phase arm there runs a second phase arm current Ian. The upper phase arm is furthermore joined to the AC terminal ACA1 via a first or upper arm reactor Laarm1, while the lower phase arm is joined to the same AC terminal ACA1 via a second or lower arm reactor Laarm2. In a similar fashion the upper phase arm of the second phase leg PL2 includes five cells C1p2, C2p2, C3p2, C4p2 and C5p2 while the lower phase arm of the second phase leg PL2 includes five cells C1n2, C2n2, C3n2, C4n2 and C5n2. Finally the upper phase arm of the third phase leg PL3 includes five cells C1p3, C2p3, C3p3, C4p3 and C5p3 while the lower phase arm of the third phase leg PL3 includes five cells C1n3, C2n3, C3n3, C4n3 and C5n3. The upper phase arms are furthermore joined to the corresponding AC terminals ACB1 and ACC1 via corresponding first or upper arm reactors Lbarm1 and Lcarm1, respectively, while the lower phase arms are joined to the same AC terminal ACB1 and ACC1 via corresponding second or lower arm reactors Lbarm2 and Lcarm2, respectively.

The number of cells provided in FIG. 1 is only an example. It therefore has to be stressed that the number of cells in a phase arm may vary. It is often favorable to have many more cells in each phase arm, especially in HVDC applications. A phase arm may for instance comprise hundreds of cells. There may however also be fewer.

Control of each cell in a phase arm is normally done through providing the cell with a control signal directed towards controlling the contribution of that cell to meeting a reference voltage. The reference voltage may be provided for obtaining a waveform on the AC terminal of a phase leg, for instance a sine wave. In order to control the cells there is therefore a control unit 12.

The control unit 12 is provided for controlling all the phase arms of the converter. However, in order to simplify the figure only the control of the upper phase arm of the first phase leg PL is indicated in FIG. 1.

The other phase arms are controlled in a similar manner in order to form output waveforms on the three AC terminals AC1, AC2 and AC3.

The control unit 12 may furthermore be used for some dedicated control with regard to handling of reactive power injection into the AC system during pole faults or with regard to operation at AC phase faults. These two situations will be described in more detail later.

The voltage source converter depicted in FIG. 1 may be an asymmetric monopole configuration. The first and second potentials Vdp and Vdn are in this case pole and ground. As an alternative it may be connected in a symmetric monopole configuration. In this case the first and second potentials Vdp and Vdn are a positive and a negative potential, where the second potential Vdn may be as large as the first potential but with the opposite polarity. In this case a midpoint between the two potentials may be grounded. In another variation the voltage source converter may be connected in a symmetric bipole configuration. In this case the second potential is again ground. However, there is also a second pole P2 providing a third potential that is negative and that may be as large as the first potential but with the opposite polarity. In the bipole configuration, there would furthermore be a third and a fourth phase arm in the phase leg, where the second and third phase arms would be connected to the second potential, the first phase arm connected between the first positive potential and the second phase arm and the fourth phase arm connected between the third negative potential of the second pole P2 and the third phase arm. A first AC terminal of a phase leg would in the symmetric bipole configuration be provided between the first and second phase arms, while a second AC terminal of the same phase leg would be provided between the third and fourth phase arms.

In all converter configurations the phase arms are furthermore connected to the AC terminals via phase reactors.

There are a number of different cell types that can be used in the converter, such as full-bridge cells and half-bridge cells.

In the phase leg there is a mixture of full-bridge and half-bridge cells. There may as an example be 50% full-bridge cells and 50% half bridge cells in each phase arm. The mixture of cells may be selected based on the desired DC fault current limitation capability.

Figure 2:
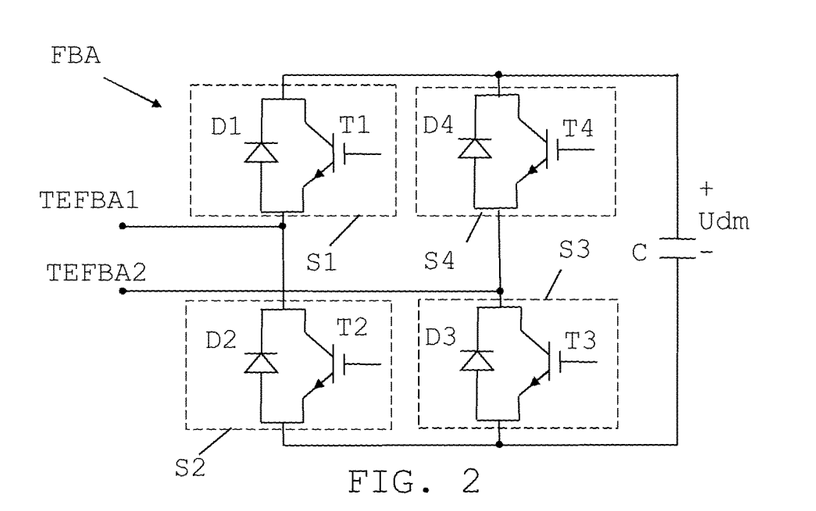

FIG. 2 shows a first variation of a full-bridge cell FBA that is to be provided in the upper phase arm of the first phase leg.

The cell FBA is thus a full-bridge converter cell and includes an energy storage element, here in the form of a capacitor C, which is connected in parallel with a first group of switching units S1 and S2. The energy storage element C provides a voltage Udm, and therefore has a positive and negative end, where the positive end has a higher potential than the negative end. The switching units S1 and S2 in the first group are connected in series with each other, where each switching unit may be realized in the form of a switch that may be an IGBT (Insulated Gate Bipolar Transistor) transistor together with an anti-parallel unidirectional conducting element. In FIG. 2 the first switching unit S1 has a first transistor T1 with a first anti-parallel diode D1. The first diode D1 is connected between the emitter and collector of the transistor T1 and has a direction of conductivity from the emitter to the collector as well as towards the positive end of the energy storage element C. The second switching unit S2 has a second transistor T2 with a second anti-parallel diode D2. The second diode D2 is connected in the same way in relation to the energy storage element C as the first diode D1, i.e. conducts current towards the positive end of the energy storage element C. The first switch S1 is furthermore connected to the positive end of the energy storage element C, while the second switch S2 is connected to the negative end of the energy storage element C.

There is also a second group of series-connected switching units S3 and S4. This second group of switching units is here connected in parallel with the first group as well as with the energy storage element C. The second group includes a third switching unit S3, here provided through a third transistor T3 with anti-parallel third diode D3 and a fourth switching unit S4, here provided through a fourth transistor T4 with anti-parallel fourth diode D4. The fourth switching unit S4 is furthermore connected to the positive end of the energy storage element C, while the third switching unit S3 is connected to the negative end of the energy storage element C. Both the diodes D3 and D4 furthermore have a current conduction direction towards the positive end of the energy storage element C. The switching units in the second group are thus connected in series with each other. The switches are here also denoted cell switches.

This full-bridge cell FBA comprises a first cell connection terminal TEFBA1 and a second cell connection terminal TEFB2, each providing a connection for the cell to the upper phase arm of the first phase leg of the voltage source converter. In this full-bridge cell the first cell connection terminal TEFBA1 more particularly provides a connection from the upper phase arm to the junction between the first and the second switching units S1 and S2, while the second cell connection terminal TEFBA2 provides a connection between the upper phase arm and a connection point between the third and fourth switching units S3 and S4. The junction between the first and second switching units S1 and S2 thus provides one cell connection terminal TEFBA1, while the junction between the third and fourth switching units S3 and S4 provides a second cell connection terminal TEFBA2. These cell connection terminals TEFBA1 and TEFBA2 thus provide points where the cell FBA can be connected to the upper phase arm of the first phase leg. The first cell connection terminal TEFBA1 thereby joins the upper phase arm with the connection point or junction between two of the series-connected switching units of the first group, here the first and second switching units, while the second cell connection terminal TEFBA2 joins the upper phase arm with a connection point between two of the series connected switching units of the second group, here between the third and fourth switching units S3 and S4. The first cell connection terminal TEFBA1 furthermore faces the first pole and thereby couples the cell to the first pole, while the second cell connection terminal TEFBA2 faces the AC terminal of the phase leg and thereby couples the cell to the AC terminal.

The expression couple or coupling is intended to indicate that more components, such as more cells and inductors, may be connected between the pole and the cell, while the expression connect or connecting is intended to indicate a direct connection between two components such as two cells. There is thus no component in-between two components that are connected to each other.

Figure 3:
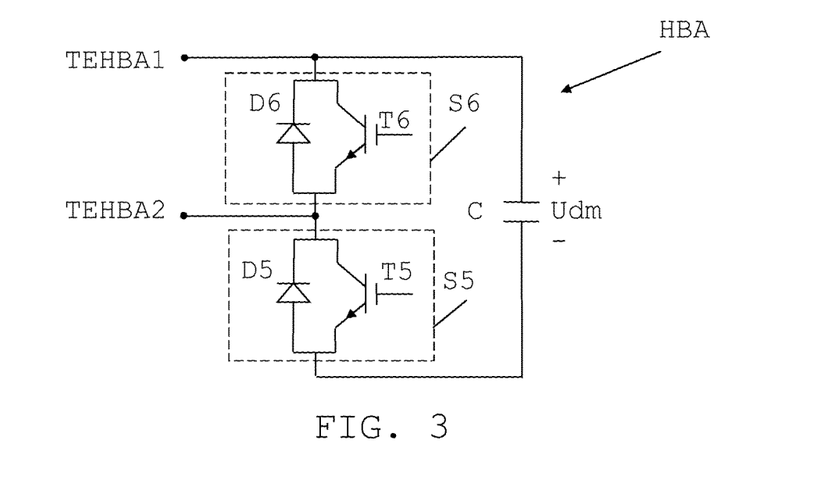

FIG. 3 schematically shows a first variation of a half-bridge converter cell HBA that may be used in the upper phase arm of the first phase leg. Also this cell includes an energy storage element, here in the form of a capacitor C, which is connected in parallel with a group of switches. Also this energy storage element C provides a voltage Udm, and thus also has a positive and negative end, where the positive end has a higher potential than the negative end. The switching units in this group are connected in series with each other. The group here includes a fifth and a sixth switching unit S5 and S6 (shown as dashed boxes), where each switching unit S5 and S6 may be realized in the form of a switch that may be an IGBT (Insulated Gate Bipolar Transistor) transistor together with an anti-parallel unidirectional conduction element, which may be a diode. In FIG. 3 there is therefore a sixth switching unit S6 having a sixth transistor T6 with a sixth anti-parallel diode D6, where the diode D6 has a current conduction direction towards the positive end of the energy storage element C and a fifth switching unit S5 connected in series with the sixth switching unit S6 and having a fifth transistor T5 with anti-parallel fifth diode D5, where the fifth diode D5 has the same direction of current conduction as the sixth diode D6. The sixth switching unit S6 is connected to the positive end of the energy storage element C, while the fifth switching unit S5 is connected to the negative end of the energy storage element C.

This first variation of half-bridge cell HBA also comprises a first cell connection terminal TEHBA1 and a second cell connection terminal TEHBA2, each providing a connection for the cell to the upper phase arm of the first phase leg of the voltage source converter. In this first half-bridge cell variation the first cell connection terminal TEHBA1 more particularly provides a connection from the upper phase arm to the junction between the sixth switching unit S6 and the capacitor C, while the second cell connection terminal TEHBA2 provides a connection from the upper phase arm to the junction between the fifth and sixth switching units S5 and S6. These cell connection terminals thus provide points where the cell can be connected to the upper phase arm. The second cell connection terminal TEHBA2 thus joins the phase arm with the connection point or junction between two of the series-connected switching units of the first group, here the fifth and sixth switching units S5 and S6, while the first cell connection terminal TEHBA1 joins the upper phase arm with a connection point between the sixth switching unit S6 and the positive end of the capacitor C. Also here the first cell connection terminal TEHBA1 faces the first pole, while the second cell connection terminal TEHBA2 faces the AC terminal of the phase leg.

Figure 4:
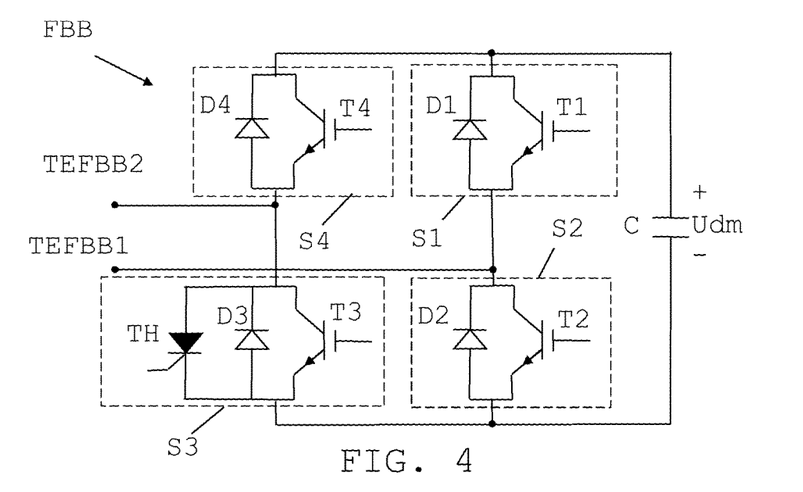

FIG. 4 shows a second variation of full-bridge cell FBB to be used in the lower phase arm. This second variation of full-bridge cell comprises the same elements as the first variation of full-bridge cell. However, it additionally comprises a bypass switch TH.

This second variation of full-bridge cell comprises a first cell connection terminal TEFBB1 and a second cell connection terminal TEFBB2 having the same positions as in the first variation of full-bridge cell.

Furthermore, the first cell connection terminal TEFBB1 provides a connection from the lower phase arm to the junction between the first and second switching units S1 and S2, while the second cell connection terminal TEFBB2 provides a connection from the lower phase arm to the junction between the third and fourth switching units S3 and S4. In this case the first cell connection terminal TEFBB1 faces the AC terminal of the phase leg, while the second cell connection terminal TEFBB2 faces the second potential, i.e. ground.

A bypass switch may be a part of a switching unit used in the control of the cell voltage contribution made by the cell. A bypass switch may be provided as a thyristor switch TH and as an example placed as a part of the third switching unit S3 in parallel with the third cell switch or transistor T3.

The thyristor switch TH furthermore has a current conduction direction that is the opposite of the current conduction direction of the diode of the switching unit in which it is provided. In this case the thyristor switch TH has a current direction that is opposite to the direction of the third diode D3. When it is an additional bypass switch in this way, it furthermore has the same orientation as the cell switch T3.

It should here be realized that as an alternative the thyristor switch TH may be a part of the first switching unit S1. It may therefore be placed in parallel with the first diode D1 and with an opposite orientation in relation to this diode.

Figure 5:
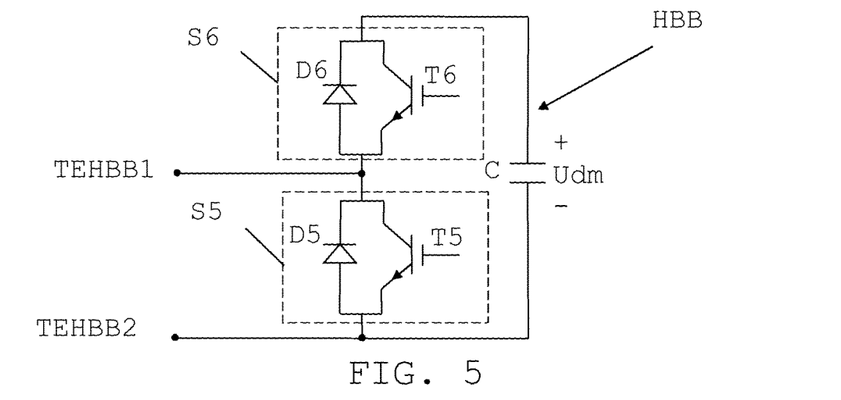

FIG. 5 shows a second variation of half-bridge cell HBB for connection in the lower phase arm of the first phase leg. It comprises a group of switches comprising a fifth and sixth switching unit S5 and S6 connected in the same way as the sixth and fifth switches of the first variation of half-bridge cell. However, in this second variation of half-bridge cell the first cell connection terminal TEHBB1 provides a connection from the lower phase arm to the junction between the fifth and sixth switching units S5 and S6, while the second cell connection terminal TEHBB2 provides a connection from the lower phase arm to the junction between the fifth switching unit S5 and the negative end of the capacitor C. In this case the first cell connection terminal TEHBB1 faces the AC terminal of the phase leg, while the second cell connection terminal TEHBB2 faces the second potential, i.e. ground.

The half-bridge cell is a first type of cell having unipolar voltage contribution capability, while the full-bridge cell is a second type of cell having bipolar voltage contribution capability.

Figure 6:
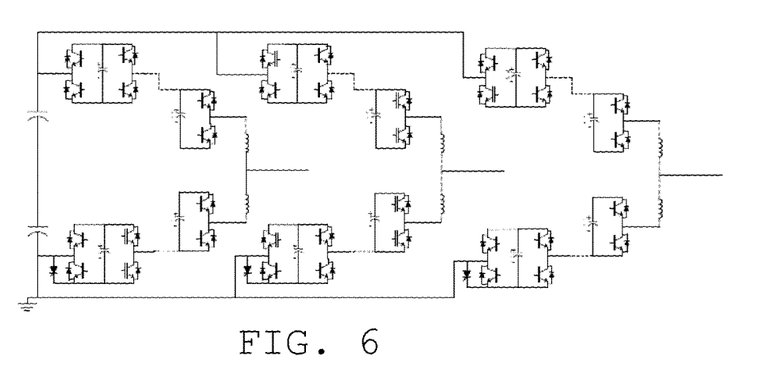

An asymmetric monopole converter with a mixture of full- and half-bridge cells of the first and second variations is schematically shown in FIG. 6. As can be seen the converter has the first variation of full- and half bridge cells in the upper phase arms and the second variation of full- and half-bridge cells in the lower phase arms. It can also be seen that the diode of the switching unit that comprises the bypass switch has an orientation with a current conduction direction towards the second potential or ground and that the bypass switch has an opposite orientation, i.e. directed away from the second potential or ground and towards the first pole and the first potential.

Figure 7:
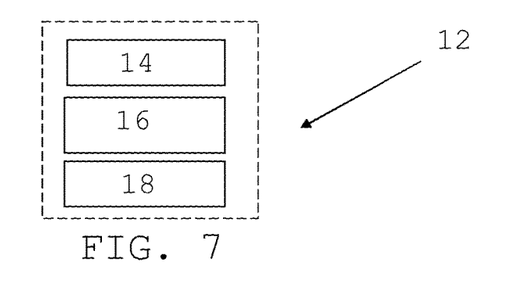

As can be seen in FIG. 7, the control unit 12 may comprise a conversion control element 14 for providing regular control where an AC voltage waveform is formed, an AC fault handling element 16 and a pole fault handling element 18. The control unit 12 is with advantage implemented through using a computer with computer program code comprising computer program instructions providing the above-mentioned elements.

One problem that may exist in multilevel converters that employ full-bridge cells is that the voltage rating of the converter needs to be high in order to handle phase faults.

Figure 8:
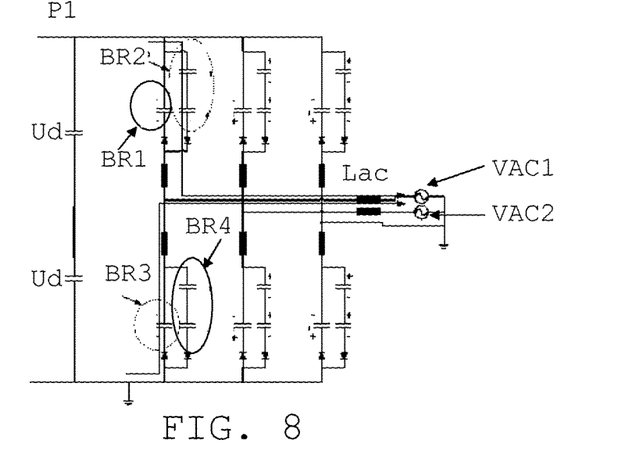
FIG. 8 shows an equivalent circuit for a converter with mixed half and full bridge cells with blocked switches during an AC phase fault in a connected AC system, FIG. 9 schematically shows a number of method steps in a method for controlling fault handling, FIG. 10 schematically shows an asymmetric monopole converter configuration employing a full-bridge cell with a bypass switch connected between cell connection terminals, FIG. 11 schematically shows an asymmetric monopole converter configuration that uses a hybrid full-bridge cell with an alternative bypass switch realized using an IGCT, FIG. 12 schematically shows a variation of an asymmetric monopole converter configuration employing a full-bridge cell with a bypass switch in both upper and lower phase arms, FIG. 13 schematically shows a variation of the asymmetric monopole converter configuration in FIG. 12 employing a hybrid full-bridge cell.

The equivalent circuit of a blocked traditional asymmetric monopole converter that uses a mixture of half-bridge and full bridge cells with three phase legs during an AC phase ground fault is shown in FIG. 8. The DC side of the converter has two capacitors connected between the pole P1 and ground, each with the voltage Ud. It can here be noted that in a symmetric monopole converter, the midpoint between these capacitors would be grounded. The converter is traditional in the sense that both the first and second phase arms of all the phase legs comprise a mixture of regular full-bridge and half-bridge cells.

The equivalent circuit in FIG. 8 represents the situation when there is an internal phase-to-ground fault, after which blocking of all cell switches has been made. An internal phase-to-ground-fault is not a fault in the connected AC system but an AC fault in the environment of the converter, such as in an AC busbar provided in a converter station.

As can be seen in the equivalent circuit in FIG. 8, the upper or first phase arm of each phase leg comprises a first capacitive branch BR1 in series with a diode with a direction of current towards the first pole P1. This branch BR1 comprises the sum of the capacitances of the full bridge cell capacitors in the upper phase arm. There is also a second capacitive branch BR2 in series with a diode having a conduction direction away from the first pole. The second capacitive branch BR2 comprises the sum of capacitances of the full bridge cell capacitors in series with the sum of the capacitances of the half-bridge cell capacitors in the upper phase arm. The first and second capacitive branches BR1 and BR2 are connected in parallel with each other. In a similar manner there is a third capacitive branch BR3 in series with a diode with a direction of current away from ground. This branch BR3 comprises the sum of the capacitances of the full bridge cell capacitors in the lower phase arm. There is also a fourth capacitive branch BR4 in series with a diode with a conduction direction towards ground. The fourth capacitive branch BR4 comprises the sum of capacitances of the full bridge cell capacitors in series with the sum of the capacitances of the half-bridge cell capacitors in the lower phase arm. The third and fourth capacitive branches BR3 and BR4 are connected in parallel with each other.

In case of a ground fault on one of the phases, this phase fault grounds the midpoint of the corresponding phase leg. The two other phase leg midpoints may then be seen as connected to AC voltage sources VAC1 and VAC2 via source impedances, which are typically transformers. These voltages have, because of the transformer, been raised with a value of $\sqrt{3}$ as compared with before the fault.

This means that the peak voltage of the healthy phases after the converter transformer becomes±1.732 Ud. At the negative peak of VAC=−1.732 Ud, this will charge the lower arm full-bridge capacitors from Ud to 1.732 Ud (73% overvoltage), and charge the upper arm (both half and full bridge) capacitors from 2 Ud to 3.732 Ud (87% overvoltage).

There is thus a considerable overvoltage that has to be handled by the converter.

In asymmetric monopole and symmetric bipole system configurations, the upper converter arm thus faces an over voltage rating of almost 80%-90% when there is an AC converter internal fault. This overvoltage exceeds the typical blocking voltage of an IGBT.

This situation would typically have to be handled through redundancy, i.e. through using additional cells that are only used for voltage rating purposes.

The size of the converter will thus have to be unnecessarily large in order to handle the overvoltages caused by this type of fault.

It can be seen that if the third capacitive branch BR3 is short-circuited, then the overvoltage of the upper or first phase arm would be drastically limited.

This insight has been used for providing a converter design in which the energy storage elements of all the converter cells of the lower or second phase arm are bypassed in case of a phase fault on the AC side of the multilevel converter. The bypassing is possible to obtain through providing the bypass switch in the full-bridge cells in the second phase arm.

Figure 9:
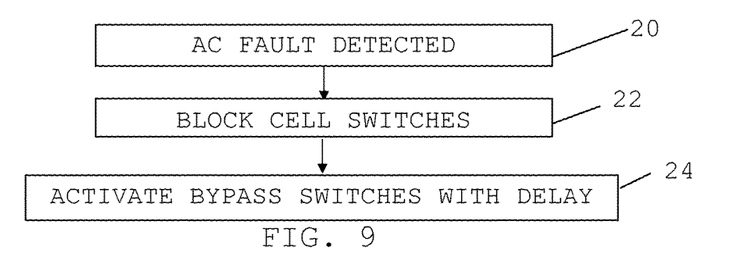

How this may be done will now be described with reference being made also to FIG. 9, which shows a number of method steps in a method of controlling fault handling.

Most of the time, it is of interest to have a symmetrical cell distribution, i.e. to have the same number of cells of the first and second type in the first and second phase arms. In order to obtain a bypass of the capacitors of the cells in the second phase arm, the bypass switch is provided in the dual polarity cells in the second phase arm, which dual polarity cells are here the above described full-bridge cells. The second phase arm thus comprises at least some full-bridge cells, where all are provided with a bypass switch that can be controlled to bypass the cell capacitor. As is indicated in FIG. 8, full-bridge cells in the lower phase arm can charge up to the line voltage in a negative cycle and cause the overvoltage in the upper arm of the converter. In order to avoid the lower arm charging, the invention proposes a bypassing of full-bridge capacitors.

The operation of the converter is the following. The AC fault handling element 16 of the control unit 12 may detect an AC bus fault on the AC side of the converter, step 20, for instance based on measured currents and/or voltages. This detection may be the detection of an AC fault on any of phases. Therefore, when a converter station internal phase-to-ground fault occurs, all the cell switches are blocked by the AC fault handling element 16 of the control unit 12, step 22. Thereafter, the AC fault handling element 16 ensures that the energy storage elements of the full-bridge cells in the second phase arm are bypassed.

In this case the AC fault handling element 16 of the control unit 12 ensures the bypassing through activating the bypass switches to bypass corresponding energy storage elements when the phase fault occurs on the AC side of the multilevel converter, step 24. The AC fault handling element 16 may thus also close the bypass switches. This closing is delayed in relation to the blocking. The delay may be at least 0.5 ms. The delay may as an alternative be in the range 0.5-2 ms. The closing may thus take place about 0.5-2 ms after the blocking. The AC fault handling element 16 of the control unit 12 may thus be configured to switch on the bypass switch TH of all full-bridge cells in the second or lower phase arm when an AC fault is detected. Furthermore, it is possible to only bypass some energy storage elements. If for instance an AC fault is detected on one of the AC phases, it may be sufficient to bypass only the full-bridge cells of the lower phase arms connected to the other AC phases. It is thus possible to leave the phase arm connected to the faulty Ac phase unchanged. The closing of the bypass switches TH will lead to the short-circuiting of the above-mentioned third capacitive branch BR3 and thereby the phase arm inductance is connected to ground. This will in turn lead to a lowering of the rating of the upper phase arm.

The bypassing of the cell capacitors connected to the healthy AC phases in relation to an AC fault situation as shown in FIG. 8 is then the following:

At the negative peak of VAC (−1.732 Ud), the low arm diode conducts with high surge current. This is the same case as a normal half-bridge converter. The surge current creates voltage drops across the source impedance. If it is assumed that Lac, i.e. the inductance associated with the AC source VAC1 or VAC2 is approximately equal to Larm, then the midpoint voltage between the upper and lower arms is approximately –0.866 Ud. This charges the upper arm (both half and full bridges) capacitors from 2 Ud to 2.866 Ud (43% overvoltage). This overvoltage level is the same as for a normal half-bridge converter, and will be further reduced if the source impedance Lac is higher than the arm impedance Larm.

It can thus be seen that the overvoltage handled by the upper phase arm is considerably reduced. The bypassing may also reduce the current rating of the diodes in addition to lowering the voltage rating of the upper phase arm.

The bypass switch may have one or more alternative placements in the second variation of full-bridge cell.

Figure 10:
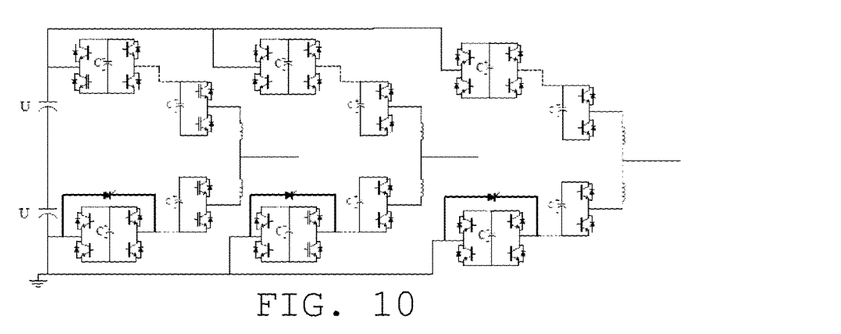

One alternative placement of the bypass switch is between the two cell connection terminals with a current conduction direction towards the AC phase terminal of the phase leg. This is schematically shown in FIG. 10.

Another alternative is to combine the bypass switch with a cell switch in a switching unit. A combined cell switch and bypass switch may be realized as an Integrated Gate-Commutated Thyristor (IGCT). Also in this case the switching unti would comprise an anti-parallel diode. In case of a fault on an AC phase, the IGCT is then switched on (while the other switches are blocked) and thereby the full-bridge capacitor is bypassed. The surge current capability of IGCT is 10 times higher than that of IGBT. The IGCT also has a stable short circuit failure behavior.

The examples above were all related to asymmetric monopole converters. However, the above described teachings may all be applied also in symmetric bipole converters.

A full-bridge cell is a dual polarity cell having bipolar voltage contribution capability. It can thus contribute voltages to the phase arm with two different polarities. The various bypass solutions described above may also be implemented in other types of dual polarity cells having bipolar voltage contributions, such as hybrid full bridge cells, so-called clamped double cells or asymmetric monopole mixed cells. The concept may thus be used for any type of cell having a bipolar voltage contribution using at least one energy storage element.

A hybrid full-bridge cell is in the context discussed here defined as a full-bridge cell where one switching unit is replaced by at least one unidirectional conducting element. A hybrid full-bridge cell in the definition used here is in one specific example thus a full-bridge where one of the switching units is replaced by a diode. Thereby the cell can furthermore be termed an asymmetric full-bridge cell or an asymmetric hybrid full-bridge cell.

Figure 11:
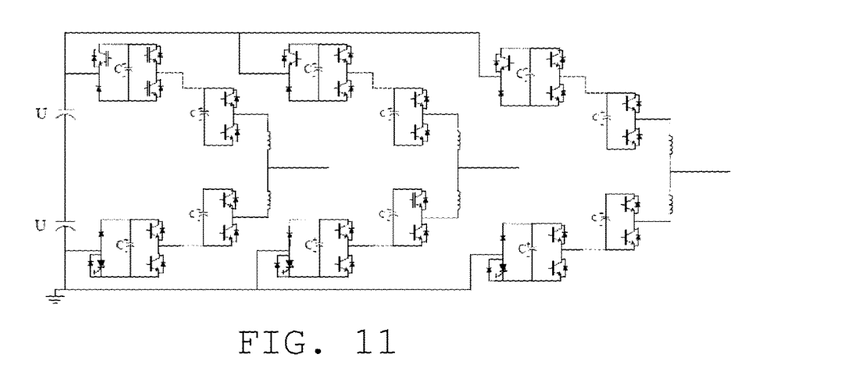

FIG. 11 shows an example of an asymmetric monopole converter with hybrid full-bridge cells using an IGCT as combined cell switch and bypass switch in the second phase arm.

The principles of the invention are applicable also in symmetric monopole converters. However, in this case the bypass switches need to be placed also in the upper phase arm.

It is thus possible to use the second variation of full-bridge cell in the upper phase arm.

Figure 12:
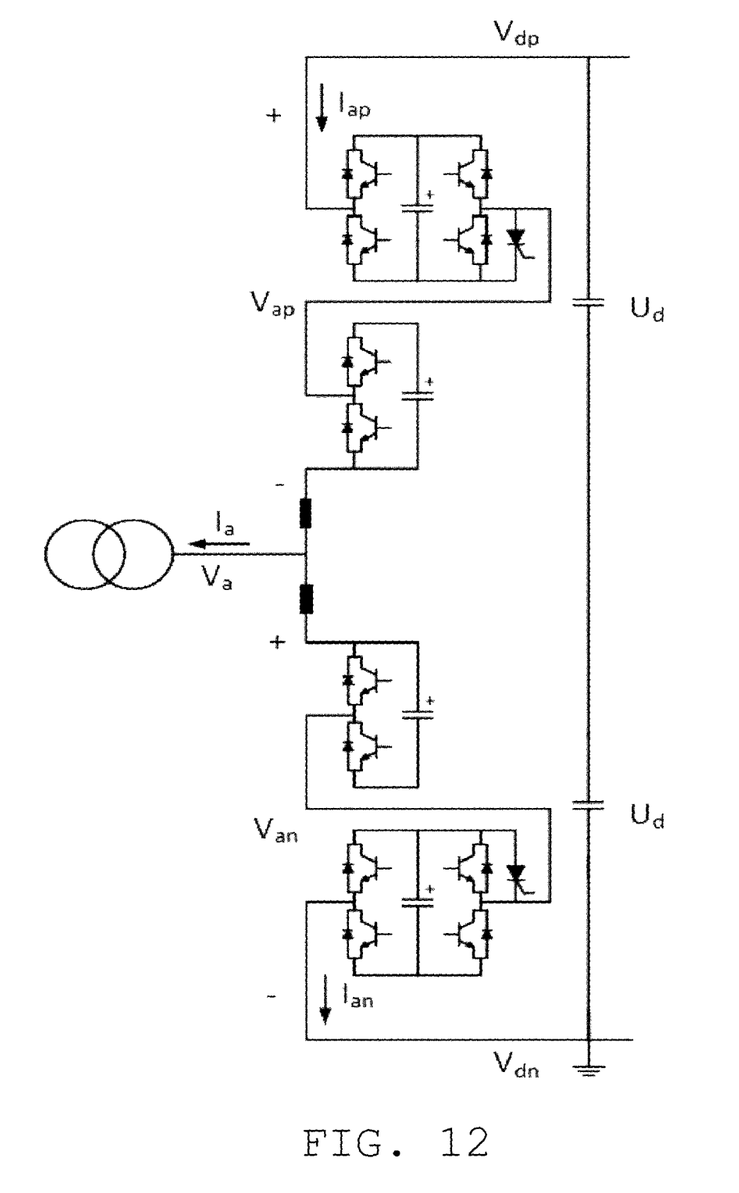

FIG. 12 schematically shows a first phase leg of an asymmetric monopole converter with mixed cells. This converter can easily be changed into a symmetric monopole converter through grounding of the capacitor midpoint and making the second potential into a negative potential that is opposite to the first potential.

As can be seen in FIG. 12, two variations of the full-bridge cell are provided; one in the upper phase arm and the other in the lower phase arm. In the lower phase arm the bypass switch is included in the first switching unit, while it is provided in the third switching unit in the upper phase arm.

This converter may be operated in the same way as the previously described converter. In normal operation, i.e. when there are no AC faults, the bypass switches are open. If an AC phase fault is detected, then all cells are blocked. Thereafter all bypass switches are opened or activated or all bypass switches connected to the healthy phases are opened or activated with a delay in relation to the blocking.

The additional bypass switches in the upper phase arm will not have any real effect on the voltage lowering in asymmetric monopole or symmetric bipole converter configurations.

However, they will have an effect in symmetric monopole converter configurations. In these converter configurations, the full-bridge cells will cause increasing voltage swings on the phase legs connected to the healthy AC phases in the case of an AC phase fault. When the bypass switch is used in the whole phase leg, i.e. in both upper and lower phase arms, these swings are reduced.

Figure 13:
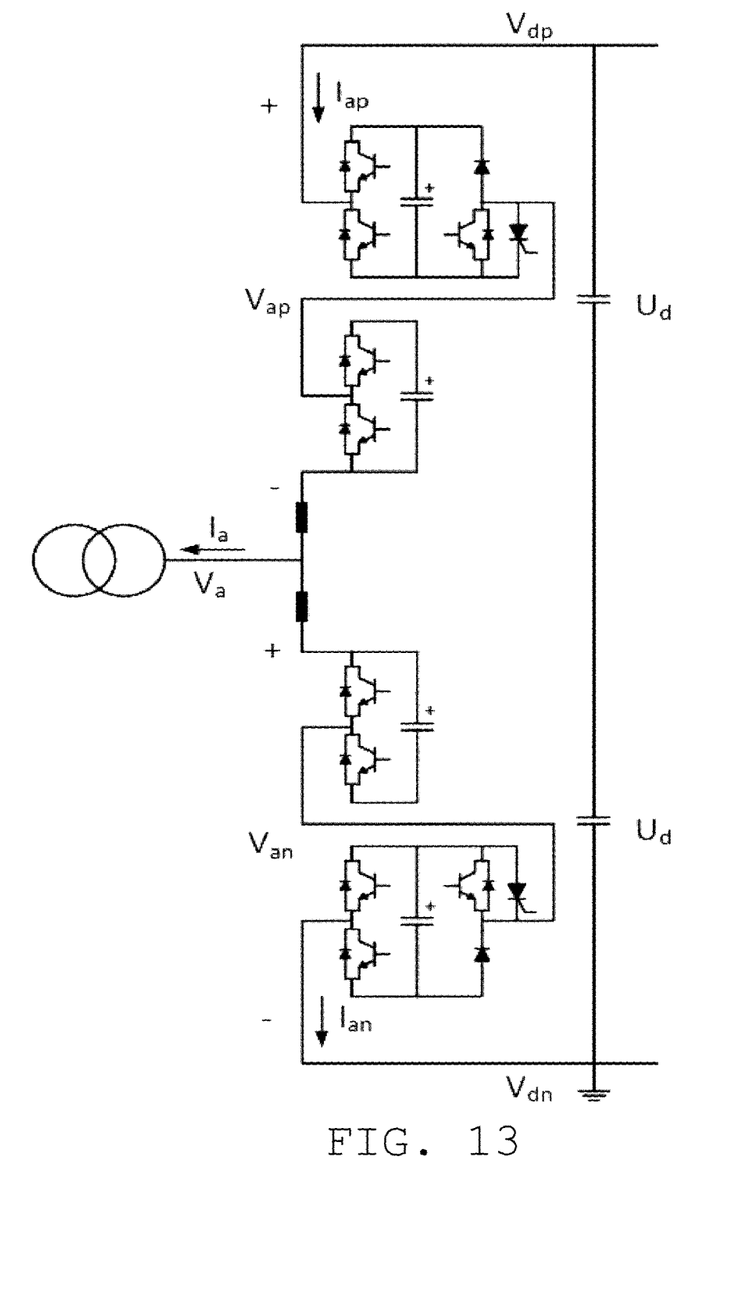

As was discussed above, the full-bridge cells may also be hybrid full-bridge cells. FIG. 13 shows one example of a phase leg similar to the phase leg in FIG. 12, but where the full-bridge cells are hybrid full bridge cells.

The invention according to the previously described aspects has a number of advantages. It reduces the cost by having 50% full-bridge cells in converter phase instead of 100% FB arms for DC current fault blocking capability within the converter. It avoids the extra rating and thus provides a cost reduction of converter by minimizing the AC fault phase to ground over rating (from 80% to 40%). It minimizes converter loss by reducing the over voltage rating. At the same time it enables the provision of full DC fault blocking capability without DC breaker and avoids an extra rating of diodes.

As mentioned earlier, the reason for using full-bridge cells is in order to limit and sometimes also block fault currents in case of a DC pole fault, such as a pole-to-pole fault or a pole-to-ground fault. How this situation may be handled will now be described with reference also being made to FIG. 14, which shows a flow chart of a number of method steps for performing reactive power compensation.

Figure 14:
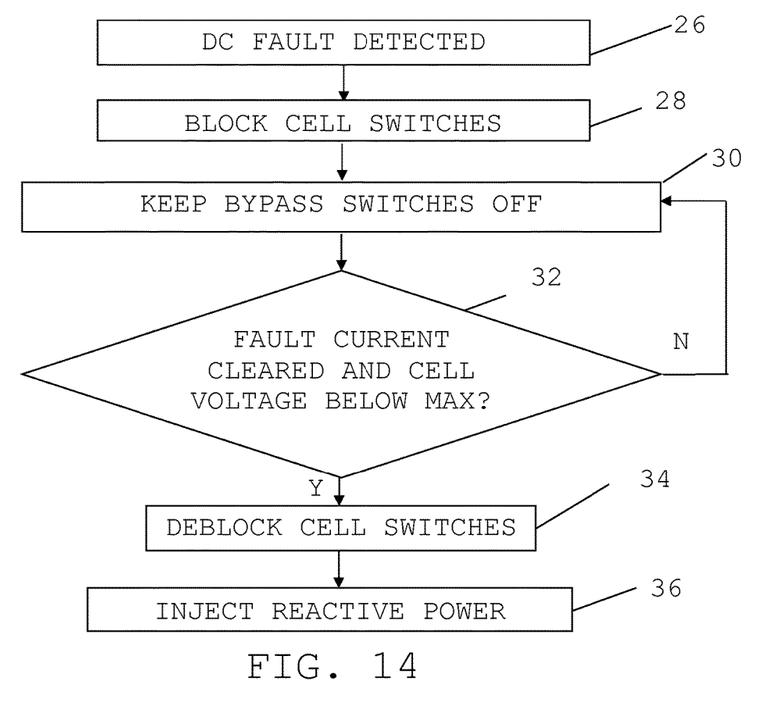
FIG. 14 shows a flow chart of a number of method steps for injection reactive power into an AC system in the case of a DC fault.

When there is a pole-to-ground fault the voltage at the AC terminal of a phase leg can be considered as forming an AC voltage source VAC feeding the phase leg with an AC voltage. When such a fault occurs, the switching elements of all the switches may be opened by the pole fault handling element 18 of the converter control unit 12.

The fault current will, when running towards pole or ground, bypass the capacitor of any half-bridge cell but run through the capacitor of the full bridge cells of the corresponding phase arm thereby limiting the fault current.

When there are pole faults on one or more poles of the converter, it may additionally be of interest to inject reactive power into the AC system via the AC terminals, such as the first AC terminal ACA1 of the first phase leg PL1. If for instance there is a pole to ground fault on the first pole P1, then the lower phase arm may be used for such injection, while the cells in the upper phase arm are being blocked.

If for instance there is a fault on the first pole P1, then the positive pole voltage drops partially or fully depending on the fault impedance, i.e., Vdp=0~Vfault and Vfault<2 Ud.

When such a fault is detected, step 26, which may be detected by the pole fault handling element 18, all switches in the first phase arm as well as second phase arm are blocked, step 28. If there are bypass switches in the converter, these remain switched off, step 30. The pole fault handling element 18 may then investigate if the DC fault current has reached a current limitation threshold, which may be that a zero current has been reached or that a current level has been reached where the operation of the cells is not jeopardized well as if any of the cells have an over voltage. It may keep all switches blocked until this situation is reached.

If the current limitation threshold level is set to be zero, then this blocking will result in zero current in all the upper phase arms, i.e. Iap=Ibp=Icp=0. As a result, the DC fault current will also become zero.

When the DC fault current has reached the current limitation threshold and there is no cell overvoltage, step 32, the pole fault handling element 18 may then deblock the cell switches in the second phase arm, step 34. These deblocked cell switches are then controlled by the pole fault handling element 18 to deliver or injectreactive power to the AC terminal ACA1, step 36. Reactive power current may then be supplied from the second phase arm cells, which would be the lower arm half-bridge cells.

In order to supply reactive power, the lower-arm half bridge cells are then inserted, under the control of the pole fault handling element 18, in the phase leg to synthesize an AC voltage waveform with a DC voltage offset, $V_{an}=U_D+V_1\sin(\omega t)>0$, where the AC output voltage Va=Van. As can be seen the offset may be half the pole voltage 2 Ud.

In this way reactive power is injected to an AC system from an asymmetric monopole system.

If there is a pole fault in a bipole system, the same operation would be applied. A pole fault on the first pole P1 would result in the same type of operation described above. In the case of a pole to ground fault on the second pole P2, then the cells of the third phase arm may be used for injecting reactive power, while the cells in the fourth phase arm are being blocked.

In case there is a pole-to-pole fault in a symmetric bipole system, then the cells of the second and third phase arms may be used for injecting reactive power, while the cells in first and fourth phase arms are blocked.

When there is a mixture of full-bridge cells and half bridge cells in a phase arm, the distribution between them may vary. The percentage of full bridge cells in a phase arm may for instance vary between 20 and 100%. As an alternative it may vary between 20 and 50%. 50% is normally the percentage required for full fault current blocking ability. A higher percentage may be wanted if redundancy is an issue, while a lower may be used if only fault current limitation is desired. The other cells, i.e. the cells that are not full-bridge cells, are furthermore not necessarily half-bridge cells. They can also be full-bridge cells or clamped double-cells. It is furthermore possible with a different distribution of full-bridge cells in the two phase arms. The full-bridge cells may furthermore be provided in other types of converters than the ones shown, such as in converters that employ full bridge-cells combined with director switches, which director switches operate at a fundamental frequency for selectively connecting an AC terminal to a waveform produced by cells in a phase arm.

From the foregoing discussion it is evident that the present invention can be varied in a multitude of ways. It shall consequently be realized that the present invention is only to be limited by the following claims.

The invention claimed is:

1. A multilevel converter configured to convert between alternating current (AC) and direct current (DC) and comprising:
   a phase leg having a first and a second phase arm, said first phase arm being connected between a first pole having a first potential and a first AC terminal and the second phase arm being connected between the first AC terminal and a second potential; and
   a control unit,
   wherein said phase arms comprise cells of a first type having a unipolar voltage contribution and cells of a second type having a bipolar voltage contribution, where each cell comprises at least one energy storage element for providing said voltage contribution and cell switching units with cell switches and anti-parallel diodes for controlling the voltage contribution, where the cells of the second type in the second phase arm each comprise a bypass switch controllable to bypass the corresponding energy storage element,
   wherein the control unit is configured to block the cell switches when a phase-to-ground fault occurs and activate the bypass switches with a delay in relation to the blocking, and
   wherein the control unit is further configured to control, when there is a pole fault on a pole connected to an AC terminal via a phase arm, the cells of another phase arm connected between the AC terminal and ground to synthesize an AC voltage waveform for injecting reactive power into the AC terminal.

2. The multilevel converter according to claim 1, wherein the delay is at least 0.5 ms.

3. The multilevel converter according to claim 2, wherein the delay is in the range 0.5-2 ms.

4. The multilevel converter according to claim 3, wherein the bypass switch of a cell of the second type is provided as a part of a switching unit.

5. The multilevel converter according to claim 4, wherein the diode of said switching unit has an orientation with a current conduction direction towards the second potential and the bypass switch has an opposite orientation.

6. The multilevel converter according to claim 5, wherein the bypass switch is a thyristor connected in parallel with the cell switch.

7. The multilevel converter according to claim 5, wherein the bypass switch is combined with the cell switch.

8. The multilevel converter according to claim 4, wherein the bypass switch is a thyristor connected in parallel with the cell switch.

9. The multilevel converter according to claim 4, wherein the bypass switch is combined with the cell switch.

10. The multilevel converter according to claim 1, wherein the cells of the second type in the first phase arm also comprise bypass switches.

11. The multilevel converter according to claim 1, wherein the waveform comprises a DC component that has a value being half the pole voltage.

12. The multilevel converter according to claim 1, the phase leg further comprising a third phase arm between the second potential and a second AC terminal-and a fourth phase arm between the second AC terminal and a second pole, and all the converter cells of second type of the third phase arm comprise a bypass switch controllable to bypass the corresponding energy storage element in case of a phase fault on the AC side of the multilevel converter.

13. A method of controlling fault handling in a phase leg of a multilevel converter converting between alternating current and direct current, the phase leg having a first and a second phase arm, said first phase arm being connected between a first pole providing a first potential and a first AC terminal and the second phase arm being connected between the first AC terminal and a second potential, said phase leg comprising cells of a first type having a unipolar voltage contribution and cells of a second type having a bipolar voltage contribution, where each cell comprises at least one energy storage element for providing said voltage contribution and switching units comprising cell switches with anti-parallel diodes for controlling the voltage contribution, wherein the cells of the second type in the second phase arm each comprise a bypass switch controllable to bypass the corresponding energy storage element, the method comprising:

upon the detection of a phase fault on the AC side of the multilevel converter,
blocking cell switches of the cells in the phase leg; and
activating the bypass switches to bypass corresponding energy storage elements, wherein the activating is made with a delay in relation to the blocking; and
detecting a DC fault on a pole connected to an AC terminal via a phase arm, blocking the cell switches of the cells of the phase leg until a DC fault current is cleared, deblocking, after clearing of a DC fault current, the cells of another phase arm connected between the AC terminal and ground and controlling the deblocked cells to synthesize an AC voltage waveform for injecting reactive power into the AC terminal.

14. The method according to claim 13, wherein the delay is at least 0.5 ms.

15. The method according to claim 14, wherein the delay is in the range 0.2-0.5 ms.

16. The method according to claim 13, wherein at least one bypass switch is provided as a part of a switching unit.

17. The method according to claim 13, the phase leg further comprising a third phase arm between a second AC terminal and the second potential and a fourth phase arm between the second AC terminal and a second pole, the activating also comprising activating the bypass switches of all the second type of cells in the third phase arm in case of a phase fault on the AC side of the multilevel converter.

18. The method according to claim 13, wherein the fault occurs on another phase than the phase to which the first AC terminal is connected.

* * * * *